US011191110B2

United States Patent
Liu

(10) Patent No.: US 11,191,110 B2
(45) Date of Patent: Nov. 30, 2021

(54) NETWORK MANAGEMENT METHOD, WIRELESS ACCESS DEVICE, TERMINAL, SYSTEM AND STORAGE MEDIUM

(71) Applicant: ZTE CORPORATION, Guangdong (CN)

(72) Inventor: Wei Liu, Guangdong (CN)

(73) Assignee: ZTE Corporation, Shenzhen (CN)

( * ) Notice: Subject to any disclaimer, the term of this patent is extended or adjusted under 35 U.S.C. 154(b) by 20 days.

(21) Appl. No.: 16/628,968

(22) PCT Filed: Jul. 9, 2018

(86) PCT No.: PCT/CN2018/094962
§ 371 (c)(1),
(2) Date: Jan. 6, 2020

(87) PCT Pub. No.: WO2019/007434
PCT Pub. Date: Jan. 10, 2019

(65) Prior Publication Data
US 2020/0229247 A1 Jul. 16, 2020

(30) Foreign Application Priority Data

Jul. 7, 2017 (CN) .......................... 201710553143.9

(51) Int. Cl.
*H04W 76/10* (2018.01)
*H04W 76/25* (2018.01)
(Continued)

(52) U.S. Cl.
CPC ........... *H04W 76/10* (2018.02); *H04W 48/10* (2013.01); *H04W 68/005* (2013.01); *H04W 76/25* (2018.02); *H04W 84/12* (2013.01)

(58) Field of Classification Search
CPC ..... H04W 48/10; H04W 76/10; H04W 76/25; H04W 68/005; H04W 84/12; H04W 8/24;
(Continued)

(56) References Cited

U.S. PATENT DOCUMENTS

2012/0189022 A1 7/2012 Gu et al.
2012/0294146 A1 11/2012 Wu
(Continued)

FOREIGN PATENT DOCUMENTS

CN 102098278 A 6/2011
CN 102223729 A 10/2011
(Continued)

OTHER PUBLICATIONS

WIPO, International Search Report dated Sep. 7, 2018.
(Continued)

*Primary Examiner* — Diane D Mizrahi
(74) *Attorney, Agent, or Firm* — Vivacqua Crane, PLLC

(57) ABSTRACT

The present disclosure discloses a network management method, including: broadcasting a message carrying access information; providing an access path to a wireless access device for a terminal which receives the message and sends an access request; acquiring a type of the terminal which accesses the wireless access device; and controlling connection between the terminal and a network according to the type of the terminal. The present disclosure further discloses a wireless access device, a terminal, a system and a storage medium.

8 Claims, 11 Drawing Sheets

(51) Int. Cl.
  *H04W 48/10*    (2009.01)
  *H04W 68/00*    (2009.01)
  *H04W 84/12*    (2009.01)

(58) Field of Classification Search
  CPC ..... H04W 48/06; H04W 88/18; H04W 68/02; H04W 24/02; H04W 48/16
  See application file for complete search history.

(56) References Cited

U.S. PATENT DOCUMENTS

| | | |
|---|---|---|
| 2016/0014815 A1 | 1/2016 | Vajapeyam et al. |
| 2016/0205693 A1 | 7/2016 | Lu et al. |
| 2019/0364492 A1 | 11/2019 | Azizi et al. |
| 2020/0205062 A1* | 6/2020 | Azizi .................. H04W 48/10 |

FOREIGN PATENT DOCUMENTS

| | | |
|---|---|---|
| CN | 102404709 A | 4/2012 |
| CN | 103369515 A | 10/2013 |
| CN | 104113934 A | 10/2014 |
| CN | 104519537 A | 4/2015 |
| CN | 105578465 A | 5/2016 |
| CN | 105871843 A | 8/2016 |
| WO | WO 2011036338 A1 | 3/2011 |

OTHER PUBLICATIONS

China Patent Office, First Office Action (OA1) dated Oct. 9, 2020 for China patent application No. CN201710553143.9.
EP, Supplementary European Search Report dated Feb. 4, 2021, EP Application No. 18827660.4.
EP, European Search Opinion dated Feb. 4, 2021, EP Application No. 18827660.4

* cited by examiner

NETWORK MANAGEMENT METHOD, WIRELESS ACCESS DEVICE, TERMINAL, SYSTEM AND STORAGE MEDIUM

CROSS-REFERENCE TO RELATED APPLICATIONS

This is a National Phase Application filed under 35 U.S.C. 371 as a national stage of PCT/CN2018/094962, filed on Jul. 9, 2018, an application claiming the priority of Chinese Patent Application No. 201710553143.9, filed on Jul. 7, 2017, the contents of which are incorporated herein in their entirety by reference.

TECHNICAL FIELD

The present disclosure relates to the communication technology, and in particular to a network management method, a wireless access device, a terminal, a system and a storage medium.

BACKGROUND

With the rise of the technology of Internet of Things, various smart home devices are able to access the internet through their own chips. During this process, a plurality of smart home devices are able to establish a network by using a Wireless-Fidelity (Wi-Fi) network and an access point (AP). In some cases, a maximum number of Wi-Fi terminals, which are allowed to simultaneously access a common wireless access device/access point, is only 16-32. When the terminals to be managed are getting more and more, users have to change to a more expensive wireless access device having stronger access capability. Therefore, how to realize maximum utilization of resources by use of existing networking equipment has become an urgent problem in the technology of Internet of Things.

SUMMARY

Embodiments of the present disclosure provide a network management method, including: broadcasting a message carrying access information; providing an access path to a wireless access device for a terminal which receives the message and sends an access request; acquiring a type of the terminal which accesses the wireless access device; and controlling connection between the terminal and a network according to the type of the terminal.

The embodiments of the present disclosure further provide a network management method, including: receiving a message carrying access information which is broadcast by a wireless access device; sending an access request to the wireless access device according to the access information; accessing the wireless access device according to an access path provided by the wireless access device; sending a type of a terminal, which accesses the wireless access device, to the wireless access device; and accepting control of connection between the terminal and a network by the wireless access device, wherein the control corresponds to the type of the terminal which accesses the wireless access device.

The embodiments of the present disclosure further provide a wireless access device, including a broadcast module configured to broadcast a message carrying access information; a connection processing module configured to provide an access path to a wireless access device for a terminal which receives the message and sends an access request; a first information transceiver module configured to acquire a type of the terminal which accesses the wireless access device; and a first control module configured to control connection between the terminal and a network according to the type of the terminal.

The embodiments of the present disclosure further provide a terminal, including a second information transceiver module configured to receive a message carrying access information which is broadcast by a wireless access device, send an access request to the wireless access device according to the access information, and receive an access path provided by the wireless access device; a second connection module configured to access the wireless access device according to the access path; and a second control module configured to accept control of connection between the terminal and a network by the wireless access device.

The embodiments of the present disclosure further provide a network management system, including a wireless access device and a terminal, wherein the wireless access device is configured to broadcast a message carrying access information, provide an access path to the wireless access device for the terminal which receives the message and sends an access request, acquire a type of the terminal which accesses the wireless access device, and control connection between the terminal and a network according to the type of the terminal; and the terminal is configured to receive the message carrying access information which is broadcast by the wireless access device, send the access request to the wireless access device according to the access information, receive the access path provided by the wireless access device, access the wireless access device according to the access path, and accept control of connection between the terminal and a network by the wireless access device.

The embodiments of the present disclosure further provide a computer-readable storage medium with computer programs stored thereon, wherein when the computer programs are executed by a processor, the processor performs the network management methods according to the above embodiments.

The embodiments of the present disclosure further provide a wireless access device, including a processor, and a memory for storing computer programs capable of being executed by the processor, wherein when the processor executes the computer programs, the processor performs the network management methods according to the above embodiments.

The embodiments of the present disclosure further provide a computer-readable storage medium with computer programs stored thereon, wherein when the computer programs are executed by a processor, the processor performs the network management methods according to the above embodiments.

The embodiments of the present disclosure further provide a terminal, including a processor, and a memory for storing computer programs capable of being executed by the processor, wherein when the processor executes the computer programs, the processor performs the network management methods according to the above embodiments.

DETAILED DESCRIPTION

Figure 1:
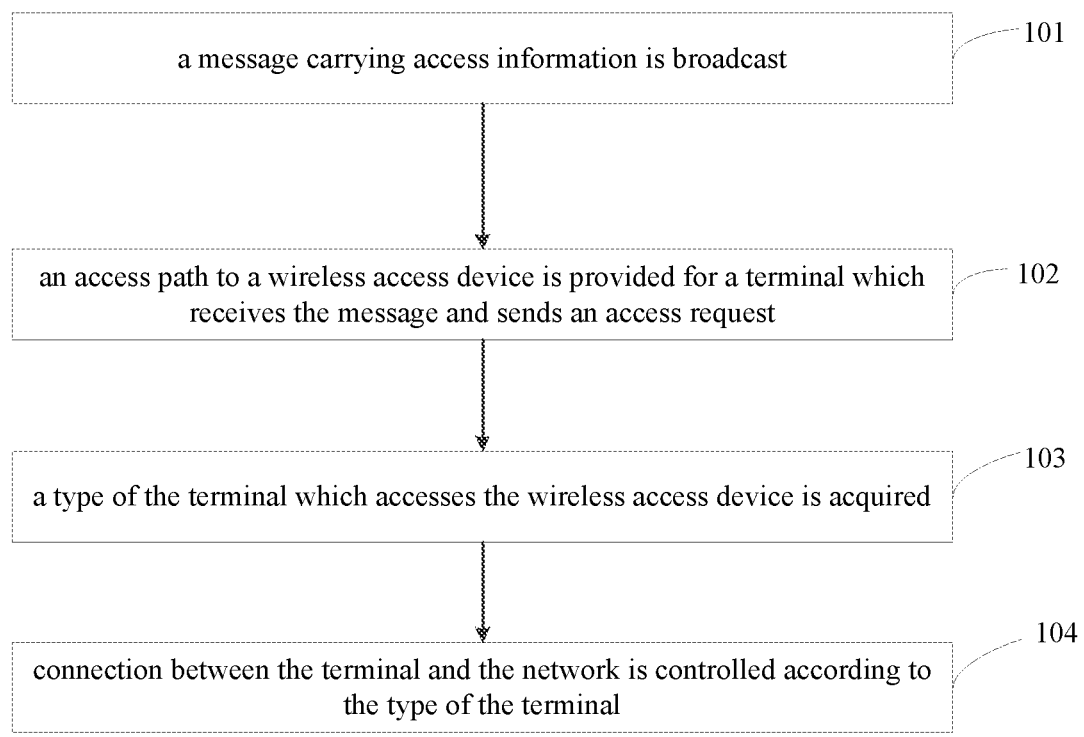
FIG. 1 is a flowchart illustrating a network management method performed on a side of a wireless access device according to embodiments of the present disclosure.

In order to enable fully understanding of the technical features and technical contents of the present disclosure, embodiments of the present disclosure will be described in detail below with reference to the accompanying drawing. The accompanying drawings are only for purposes of reference and illustration, but are not intended to limit the present disclosure.

It should be noted that, unless otherwise specified and limited, terms "first/second" in the embodiments of the present disclosure are only used to distinguish similar objects, but do not define a specific order of the objects. It should be understood that, "first/second" may be interchanged in allowable cases, so that the embodiments described herein can be implemented in an order other than those illustrated by the drawings or described herein.

Before further describing the present disclosure in detail, terms involved in the present disclosure, such as a permanent online terminal, an active reporting terminal and a passive paging terminal, are explained below.

A permanent online terminal keeps Wi-Fi connection with a wireless access device all the time. The permanent online terminal may be, for example, a camera for real-time monitoring, a data backup device, and the like.

An active reporting terminal accesses a wireless access device at a fixed time interval, reports data, and automatically disconnects Wi-Fi connection after finishing the report. In order to reduce power consumption, the active reporting terminal can turn off the Wi-Fi function thereof completely while disconnecting its connection with the wireless access device. Other than accessing the wireless access device at the fixed time interval, the active reporting terminal can also access the wireless access device in response to an event of itself, so as to perform data interaction. The active reporting terminal may be, for example, a water/electric meter which is required to report data periodically, and the event may be, for example, an alarm event triggered by abnormal data of the water/electric meter.

A passive paging terminal can, based on the definition of the active reporting terminal, access a wireless access device through monitoring broadcast messages periodically sent by the wireless access device when there is a request in a network (that is, the passive paging terminal is called by the network). In order to respond to the request of the network promptly, the passive paging terminal needs to send keep-alive messages during accessing to the wireless access device. In some cases, in order to reduce power consumption, a Wi-Fi module of the passive paging terminal only works in a monitoring state while the passive paging terminal is disconnected from the wireless access device, that is, only a receiving function is turned on but a sending function is turned off. The passive paging terminal may be, for example, a remote-controllable air conditioner which can receive a request command from the network to realize remote control.

FIG. 1 is a flowchart illustrating a network management method performed on a side of a wireless access device according to embodiments of the present disclosure. As shown in FIG. 1, the network management method includes the following Steps 101-104.

In Step 101, a message carrying access information is broadcast.

Specifically, the access information may include at least one of the following information: an access capability parameter of the wireless access device, a number of connected terminals, and an identification of a called terminal. The access capability parameter of the wireless access device is used to indicate an upper limit of a number of terminals that are allowed to access the wireless access device. The identification of a called terminal is used to indicate a terminal which is requested by a network to execute an instruction, and it may be null. The identification includes, but is not limited to, a MAC address of the terminal, and the terminal can be uniquely determined by the identification.

In Step 102, an access path to the wireless access device is provided for a terminal which receives the message and sends an access request.

The step of providing an access path to the wireless access device for a terminal which sends an access request includes: lining newly received access requests up when a load of the wireless access device reaches a predetermined load; and when the load of the wireless access device is lower than the predetermined load, providing the access path to the wireless access device for the terminals which send the access requests in the line according to priority of types of the terminals which send the access requests in the line.

In practical application, the network cannot notice whether a terminal has been disconnected from the wireless access device, so the network can normally transmit data to the terminal through the wireless access device. Only when there is a need to transmit data, connection between the wireless access device and the terminal is established, and the connection is disconnected after the transmission is completed. In such a way, utilization efficiency of access resources of the access device can be increased to the greatest extent.

The case in which a load of the wireless access device reaches a predetermined load includes a case in which a number of the terminals which have accessed the wireless access device is equal to the maximum number of terminals that are allowed to access, or, a case in which a number of the terminals which have accessed the wireless access device is equal to a predetermined proportion of the maximum number of terminals that are allowed to access.

The priority of the terminals which send the access requests may be set in the following descending order: the passive paging terminal, the permanent online terminal, and the active reporting terminals; or the priority may be adjusted according to requirements for real-time, that is, the terminal having high requirements for real-time has high priority.

In Step 103, a type of the terminal which accesses the wireless access device is acquired.

Specifically, the types of the terminals include a passive paging terminal, an active reporting terminal, and a permanent online terminal.

In Step 104, connection between the terminal and the network is controlled according to the type of the terminal.

In an embodiment, in a case that the type of the terminal is a permanent online terminal, the step of controlling connection between the terminal and the network includes: maintaining connection between the permanent online terminal and the network, and transmitting network communication data to the permanent online terminal.

In another embodiment, in a case that the type of the terminal is an active reporting terminal, the step of controlling connection between the terminal and the network includes: disconnecting connection between the active reporting terminal and the network after finishing transmitting network communication data to the active reporting terminal. The step of controlling connection between the terminal and the network further includes: receiving an access request sent by the active reporting terminal when the active reporting terminal meets an access condition, and establishing connection between the active reporting terminal and the network, wherein the access condition include at least one of the following conditions: when a fixed access time arrives, and when an event that triggers access happens at the active reporting terminal.

In another embodiment, in a case that the type of the terminal is a passive paging terminal, the step of controlling connection between the terminal and the network further includes: after finishing transmitting network communication data to the passive paging terminal, disconnecting a link between the passive paging terminal and the wireless access device in the connection between the passive paging terminal and the network, and maintaining a link between the wireless access device and the network in the connection between the passive paging terminal and the network. The step of controlling connection between the terminal and the network further includes: receiving an access request sent by the passive paging terminal when the passive paging terminal meets an access condition, and establishing connection between the passive paging terminal and the network, wherein the access condition include at least one of the following conditions: when the passive paging terminal is called by the network, when a fixed access time arrives, and when an event that triggers access happens at the passive paging terminal. When the passive paging terminal is called by the network, a message carrying access information is sent to the passive paging terminal via the wireless access device, wherein the access information includes an identification of the passive paging terminal, and the identification is used for the terminal to send an access request to the wireless access device when the identification is acquired by the terminal through monitoring.

Specifically, the step of maintaining a link between the wireless access device and the network in the connection between the passive paging terminal and the network includes: acquiring a rule of keep-alive messages sent by the passive paging terminal during accessing, and sending keep-alive message which conform to the rule to the network in a preset period. The keep-alive messages are sent for preventing aging of IP links, so as to ensure that the terminal can respond to a call instruction in time in the presence of the call instruction. Specifically, the wireless access device may be a wireless router.

Figure 2:
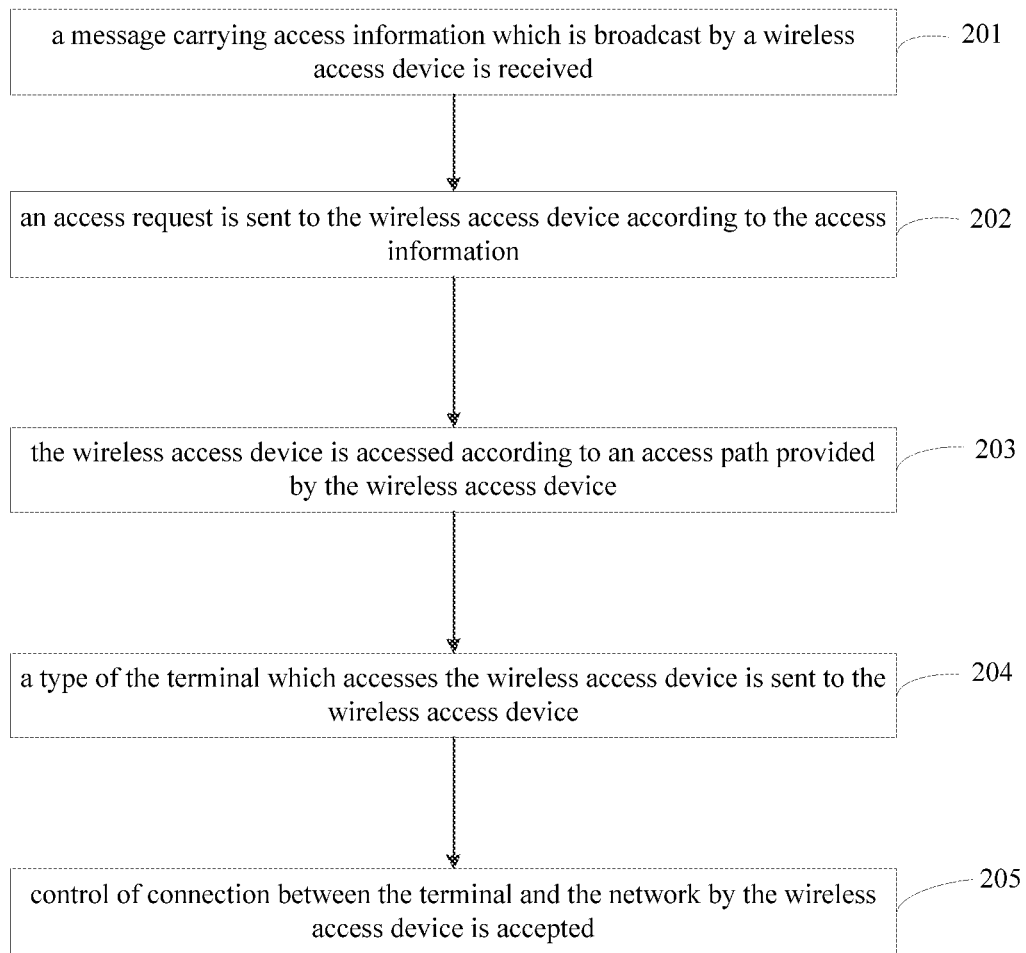
FIG. 2 is a flowchart illustrating a network management method performed on a side of a terminal according to embodiments of the present disclosure.

FIG. 2 is a flowchart illustrating a network management method performed on a side of a terminal according to embodiments of the present disclosure. As shown in FIG. 2, the network management method includes the following Steps 201-205.

In Step 201, a message carrying access information which is broadcast by a wireless access device is received.

Specifically, the access information may include at least one of the following information: an access capability parameter of the wireless access device, a number of connected terminals, and an identification of a called terminal. The access capability parameter of the wireless access device is used to indicate an upper limit of a number of terminals that are allowed to access the wireless access device. The identification of a called terminal is used to indicate a terminal which is requested by a network to execute an instruction, and it may be null. The identification includes, but is not limited to, a MAC address of the terminal, and the terminal can be uniquely determined by the identification.

In Step 202, an access request is sent to the wireless access device according to the access information.

In Step 203, the wireless access device is accessed according to an access path provided by the wireless access device.

In Step 204, a type of the terminal which accesses the wireless access device is sent to the wireless access device.

Specifically, the types of the terminals include a permanent online terminal, an active reporting terminal, and a passive paging terminal.

In Step 205, control of connection between the terminal and the network by the wireless access device is accepted, wherein the control corresponds to the type of the terminal which accesses the wireless access device.

In an embodiment, in a case that the type of the terminal is a permanent online terminal, the step of accepting control of connection between the terminal and the network by the wireless access device includes: maintaining connection between the permanent online terminal and the network, and transmitting network communication data through the connection with the network.

In another embodiment, in a case that the type of the terminal is an active reporting terminal, the step of accepting control of connection between the terminal and the network by the wireless access device includes: disconnecting the connection with the network when the active reporting terminal finishes transmitting network communication data. The step of accepting control of connection between the terminal and the network by the wireless access device further includes: sending an access request by the active reporting terminal when the active reporting terminal meets an access condition, wherein the access condition include at least one of the following conditions: when a fixed access time arrives, and when an event that triggers access happens at the active reporting terminal.

In another embodiment, in a case that the type of the terminal is a passive paging terminal, the step of accepting control of connection between the terminal and the network by the wireless access device includes: when the passive paging terminal finishes transmitting network communication data, disconnecting a link between the passive paging terminal and the wireless access device in the connection between the passive paging terminal and the network. The step of accepting control of connection between the terminal and the network by the wireless access device further includes: sending an access request by the passive paging terminal when the passive paging terminal meets an access condition, wherein the access condition include at least one of the following conditions: when it is acquired through monitoring that the passive paging terminal is called, when a fixed access time arrives, and when an event that triggers access happens at the passive paging terminal. The step of accepting control of connection between the terminal and the network by the wireless access device further includes: sending keep-alive messages to the network by the passive paging terminal via the wireless access device during the access of the passive paging terminal.

In practical application, the network cannot notice whether a terminal has been disconnected from the wireless access device, so the network can normally transmit data to the terminal through the wireless access device. Only when there is a need to transmit data, connection between the wireless access device and the terminal is established, and the connection is disconnected after the transmission is completed. In such a way, utilization efficiency of access resources of the access device can be increased to the greatest extent.

A case in which a load of the wireless access device reaches a predetermined load includes a case in which a number of the terminals which have accessed the wireless access device is equal to the maximum number of terminals that are allowed to access, or, a case in which a number of the terminals which have accessed the wireless access device is equal to a predetermined proportion of the maximum number of terminals that are allowed to access.

Priority of the terminals which send the access requests may be set in the following descending order: the passive paging terminal, the permanent online terminal, and the active reporting terminals; or the priority may be adjusted according to requirements for real-time, that is, the terminal having high requirements for real-time has high priority.

Figure 3:
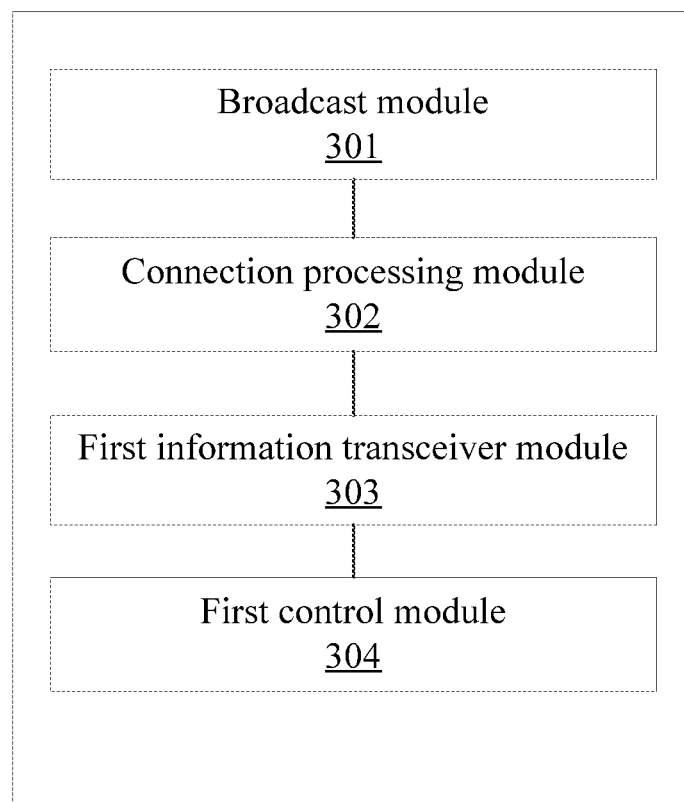
FIG. 3 is a block diagram illustrating a structure of a wireless access device according to an embodiment of the present disclosure.

FIG. 3 is a block diagram illustrating a structure of a wireless access device according to an embodiment of the present disclosure. As shown in FIG. 3, the wireless access device includes a broadcast module 301, a connection processing module 302, a first information transceiver module 303, and a first control module 304.

The broadcast module 301 is configured to broadcast a message carrying access information.

The connection processing module 302 is configured to provide an access path to a wireless access device for a terminal which receives the message and sends an access request.

The first information transceiver module 303 is configured to acquire a type of the terminal which accesses the wireless access device.

The first control module 304 is configured to control connection between the terminal and a network according to the type of the terminal.

The wireless access device further includes an information acquisition module (not shown), which is configured to acquire a rule of keep-alive messages sent by a passive paging terminal during accessing.

The broadcast module 301, the connection processing module 302, the first information transceiver module 303, and the first control module 304 may be further configured to perform the corresponding steps of the network management method described above in conjunction with FIG. 1 and achieve the same technical effects. The method has been described above in detail, and thus will not be repeated here.

It should be noted that the division of the above modules is only exemplary. In practical application, the above processing steps may be performed by different modules as required, that is, the internal structure of the wireless access device may be divided into modules different from those shown in FIG. 3 for performing all or part of the processing steps described above.

Another embodiment of the present disclosure further provides a wireless access device. The wireless access device includes a processor, and a memory for storing computer programs capable of being executed by the processor, wherein the processor is configured to perform the corresponding steps of the network management method described above in conjunction with FIG. 1 and achieve the same technical effects by executing the computer programs. The method has been described above in detail, and thus will not be repeated here.

Figure 4:
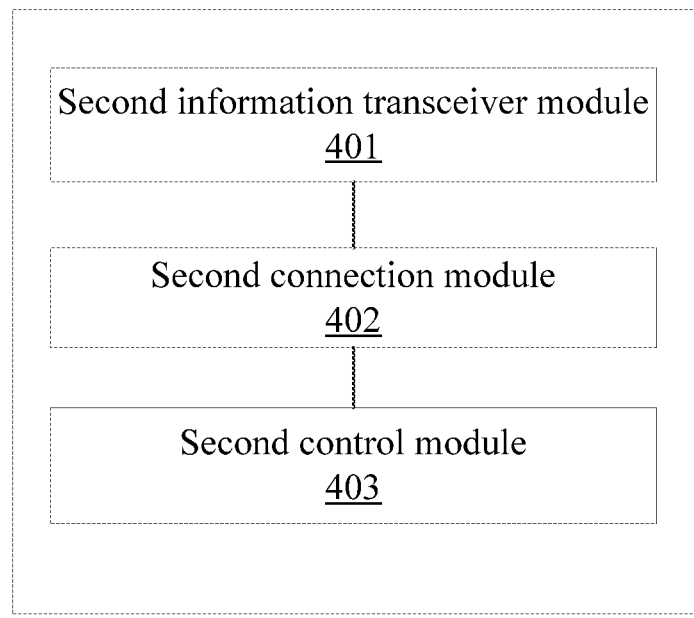
FIG. 4 is a block diagram illustrating a structure of a terminal according to an embodiment of the present disclosure.

FIG. 4 is a block diagram illustrating a structure of a terminal according to an embodiment of the present disclosure. As shown in FIG. 4, the terminal includes a second information transceiver module 401, a second connection module 402, and a second control module 403.

The second information transceiver module 401 is configured to receive a message carrying access information which is broadcast by a wireless access device, send an access request to the wireless access device according to the access information, and receive an access path provided by the wireless access device.

The second connection module 402 is configured to access the wireless access device according to the access path.

The second control module 403 is configured to accept control of connection between the terminal and a network by the wireless access device.

The second information transceiver module 401, the second connection module 402 and the second control module 403 may be further configured to perform the corresponding steps of the network management method described above in conjunction with FIG. 2 and achieve the same technical effects. The method has been described above in detail, and thus will not be repeated here.

Figure 5:
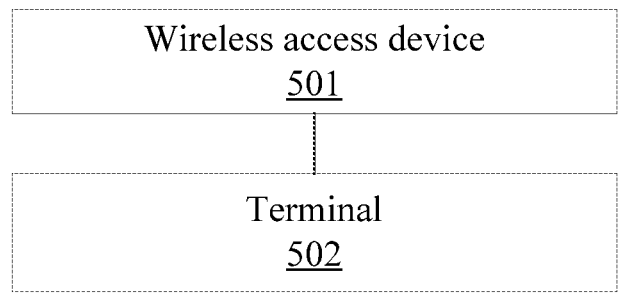
FIG. 5 is a block diagram illustrating a structure of a network management system according to an embodiment of the present disclosure.

FIG. 5 is a block diagram illustrating a structure of a network management system according to an embodiment of the present disclosure. As shown in FIG. 5, the network management system includes a wireless access device 501 and a terminal 502.

The wireless access device 501 is configured to broadcast a message carrying access information, provide an access path to the wireless access device for the terminal which receives the message and sends an access request, acquire a type of the terminal which accesses the wireless access device, and control connection between the terminal and a network according to the type of the terminal.

Specifically, the wireless access device 501 may be a wireless router.

The terminal 502 is configured to receive the message carrying access information which is broadcast by the wireless access device, send the access request to the wireless access device according to the access information, receive the access path provided by the wireless access device, access the wireless access device according to the access path, and accept control of connection between the terminal and a network by the wireless access device.

In practical application, the network management system may further include a network server (not shown), which is configured to receive data sent by the terminal 502 via the wireless access device 501, receive keep-alive messages sent by the terminal 502 via the wireless access device 501, and send a call instruction to the terminal 502 via the wireless access device 501.

Figure 6:
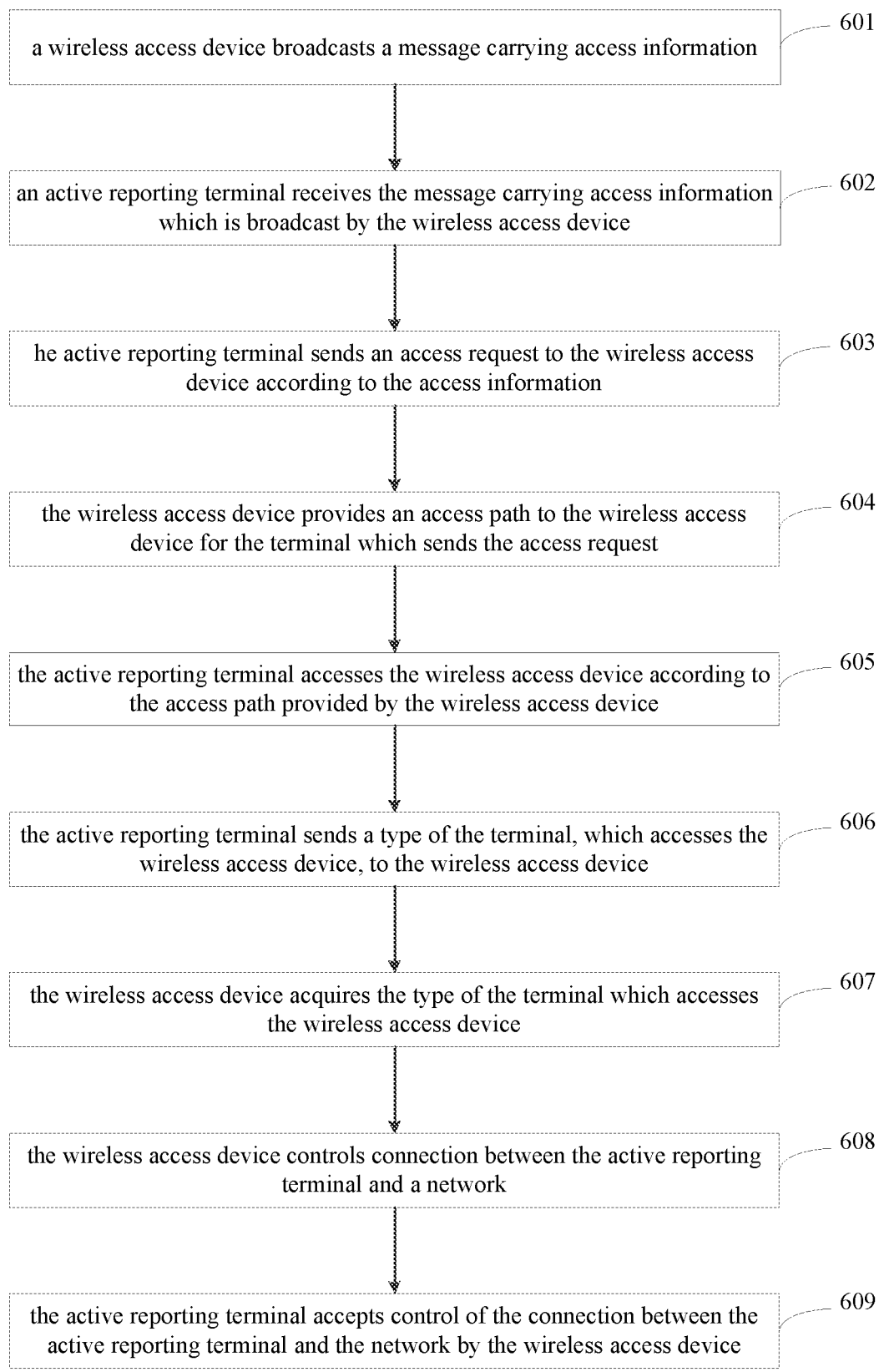
FIG. 6 is a flowchart illustrating work of a network management system according to an embodiment of the present disclosure, in a case that a terminal is an active reporting terminal.

FIG. 6 is a flowchart illustrating work of a network management system according to an embodiment of the present disclosure, in a case that a terminal is an active reporting terminal. As shown in FIG. 6, the workflow includes the following Steps 601 and 609.

In Step 601, a wireless access device broadcasts a message carrying access information.

Specifically, the access information may include at least one of the following information: an access capability parameter of the wireless access device, a number of connected terminals, and an identification of a called terminal. The access capability parameter of the wireless access device is used to indicate an upper limit of a number of terminals that are allowed to access the wireless access device. The identification of a called terminal is used to indicate a terminal which is requested by a network to execute an instruction, and it may be null. The identification includes, but is not limited to, a MAC address of the terminal, and the terminal can be uniquely determined by the identification.

In Step 602, an active reporting terminal receives the message carrying access information which is broadcast by the wireless access device.

In Step 603, the active reporting terminal sends an access request to the wireless access device according to the access information.

In Step 604, the wireless access device provides an access path to the wireless access device for the active reporting terminal which sends the access request.

In Step 605, the active reporting terminal accesses the wireless access device according to the access path provided by the wireless access device.

In Step 606, the active reporting terminal sends a type of the terminal, which accesses the wireless access device, to the wireless access device.

In Step 607, the wireless access device acquires the type of the terminal which accesses the wireless access device.

In Step 608, the wireless access device controls connection between the active reporting terminal and a network.

The step of controlling connection between the active reporting terminal and a network by the wireless access device includes: disconnecting connection between the active reporting terminal and the network when the active reporting terminal finishes transmitting network communication data. The step of controlling connection between the active reporting terminal and a network by the wireless access device further includes: receiving an access request sent by the active reporting terminal when the active reporting terminal meets an access condition, and establishing connection between the active reporting terminal and the network, wherein the access condition include at least one of the following conditions: when a fixed access time arrives, and when an event that triggers access happens at the active reporting terminal.

In Step 609, the active reporting terminal accepts control of the connection between the active reporting terminal and the network by the wireless access device.

Specifically, the step of accepting control of the connection between the active reporting terminal and the network by the wireless access device includes: disconnecting the connection with the network when the active reporting terminal finishes transmitting network communication data. The step of accepting control of the connection between the active reporting terminal and the network by the wireless access device further includes: sending an access request to the wireless access device by the active reporting terminal when the active reporting terminal meets an access condition, wherein the access condition include at least one of the following conditions: when a fixed access time arrives, and when an event that triggers access happens at the active reporting terminal.

Figure 7:
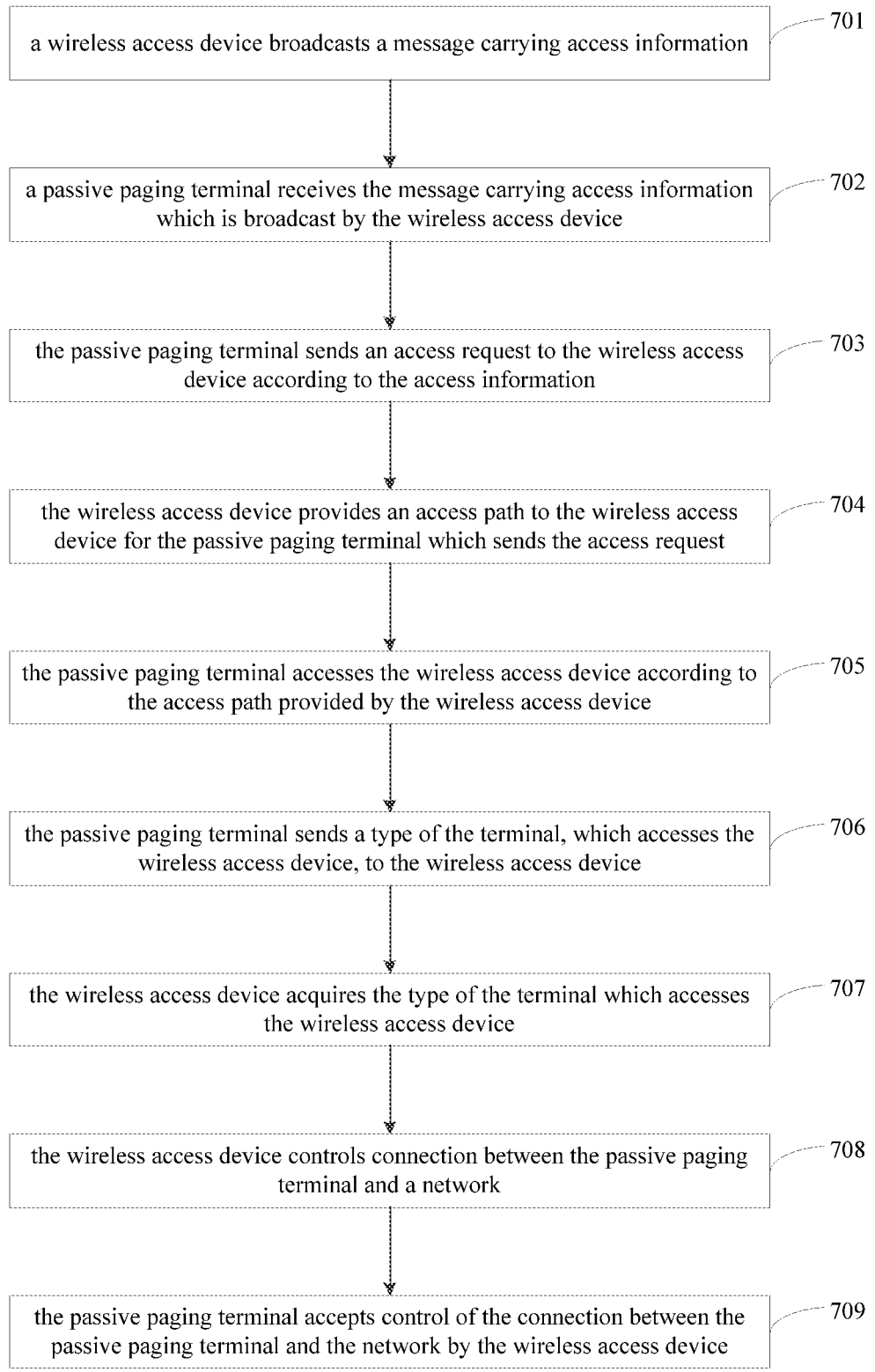
FIG. 7 is a flowchart illustrating work of a network management system according to an embodiment of the present disclosure, in a case that a terminal is a passive paging terminal.

FIG. 7 is a flowchart illustrating work of a network management system according to an embodiment of the present disclosure, in a case that a terminal is a passive paging terminal. As shown in FIG. 7, the workflow includes the following Steps 701 and 709.

In Step 701, a wireless access device broadcasts a message carrying access information.

Specifically, the access information may include at least one of the following information: an access capability parameter of the wireless access device, a number of connected terminals, and an identification of a called terminal. The access capability parameter of the wireless access device is used to indicate an upper limit of a number of terminals that are allowed to access the wireless access device. The identification of a called terminal is used to indicate a terminal which is requested by a network to execute an instruction, and it may be null. The identification includes, but is not limited to, a MAC address of the terminal, and the terminal can be uniquely determined by the identification.

In Step 702, a passive paging terminal receives the message carrying access information which is broadcast by the wireless access device.

In Step 703, the passive paging terminal sends an access request to the wireless access device according to the access information.

In Step 704, the wireless access device provides an access path to the wireless access device for the passive paging terminal which sends the access request.

In Step 705, the passive paging terminal accesses the wireless access device according to the access path provided by the wireless access device.

In Step 706, the passive paging terminal sends a type of the terminal, which accesses the wireless access device, to the wireless access device.

In Step 707, the wireless access device acquires the type of the terminal which accesses the wireless access device.

In Step 708, the wireless access device controls connection between the passive paging terminal and a network.

The step of controlling connection between the passive paging terminal and a network by the wireless access device includes: when the passive paging terminal finishes transmitting network communication data, disconnecting a link between the passive paging terminal and the wireless access device in the connection between the passive paging terminal and the network, and maintaining a link between the wireless access device and the network in the connection between the passive paging terminal and the network. The step of controlling connection between the passive paging terminal and a network by the wireless access device further includes: receiving an access request sent by the passive paging terminal when the passive paging terminal meets an access condition, and establishing connection between the passive paging terminal and the network, wherein the access condition include at least one of the following conditions: when the passive paging terminal is called by the network, when a fixed access time arrives, and when an event that triggers access happens at the passive paging terminal. When the passive paging terminal is called by the network, a message carrying access information is sent to the passive paging terminal via the wireless access device, wherein the access information includes an identification of the passive paging terminal, and the identification is used for the terminal to send an access request to the wireless access device when the identification is acquired by the terminal through monitoring.

Specifically, the step of maintaining a link between the wireless access device and the network in the connection between the passive paging terminal and the network includes: acquiring a rule of keep-alive messages sent by the passive paging terminal during accessing, and sending keep-alive message which conform to the rule to the network in a preset period. The keep-alive messages are sent for preventing aging of IP links, so as to ensure that the terminal can respond to a call instruction in time in the presence of the call instruction.

In Step 709, the passive paging terminal accepts control of the connection between the passive paging terminal and the network by the wireless access device.

Specifically, the step of accepting, by the passive paging terminal, control of the connection between the terminal and the network by the wireless access device includes: when the passive paging terminal finishes transmitting network communication data, disconnecting a link between the passive paging terminal and the wireless access device in the connection between the passive paging terminal and the network. The step of accepting, by the passive paging terminal, control of connection between the terminal and the network by the wireless access device further includes: sending an access request by the passive paging terminal to the wireless access device when the passive paging terminal meets an access condition, wherein the access condition include at least one of the following conditions: when it is acquired through monitoring that the passive paging terminal is called, when a fixed access time arrives, and when an event that triggers access happens at the passive paging terminal. The step of accepting, by the passive paging terminal, control of connection between the terminal and the network by the wireless access device further includes: sending keep-alive messages to the network by the passive paging terminal via the wireless access device during the access of the passive paging terminal.

Figure 8:
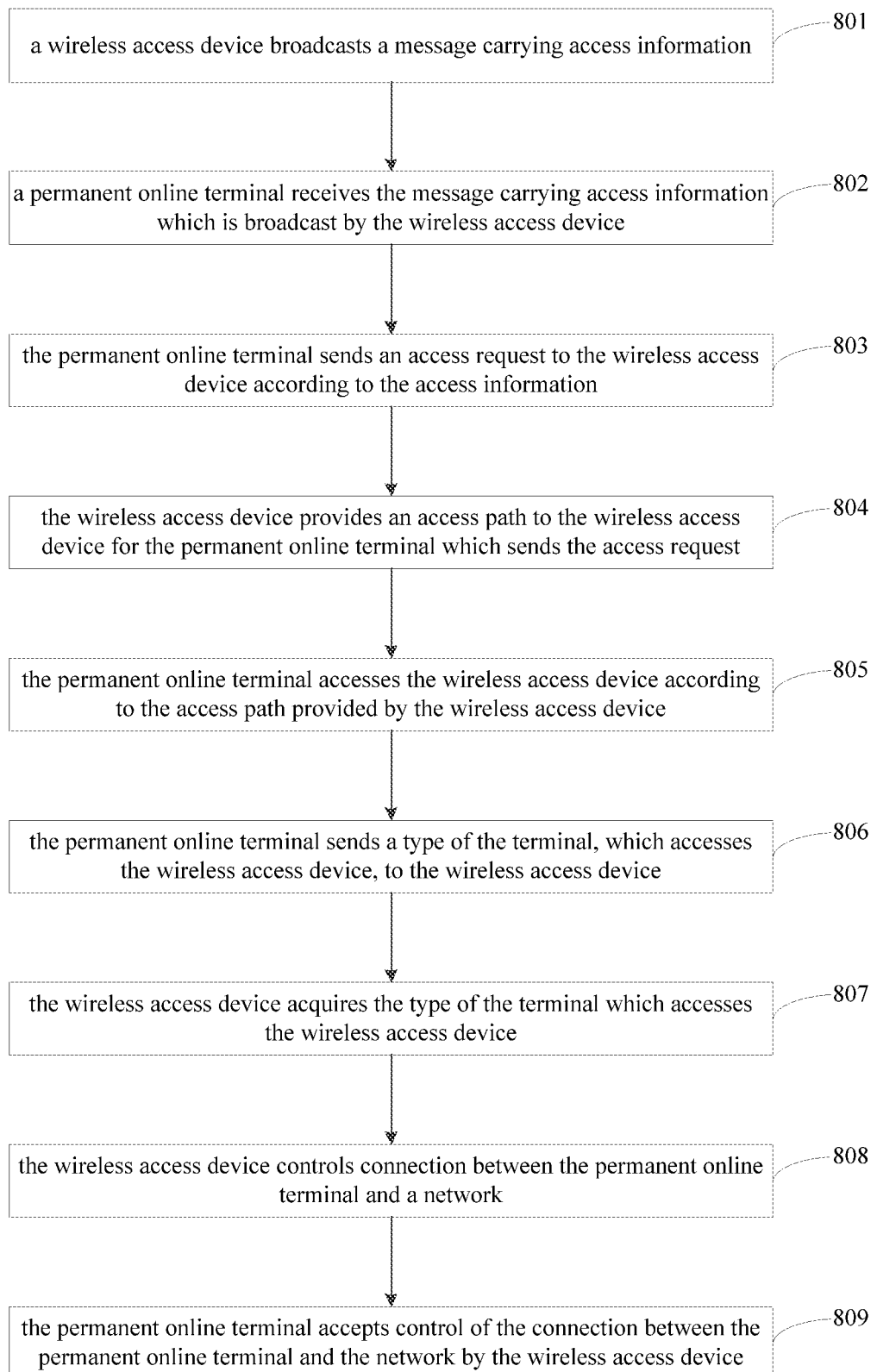
FIG. 8 is a flowchart illustrating work of a network management system according to an embodiment of the present disclosure, in a case that a terminal is a permanent online terminal.

FIG. 8 is a flowchart illustrating work of a network management system according to an embodiment of the present disclosure, in a case that a terminal is a permanent online terminal. As shown in FIG. 8, the workflow includes the following Steps 801 and 809.

In Step 801, a wireless access device broadcasts a message carrying access information.

Specifically, the access information may include at least one of the following information: an access capability parameter of the wireless access device, a number of connected terminals, and an identification of a called terminal. The access capability parameter of the wireless access device is used to indicate an upper limit of a number of terminals that are allowed to access the wireless access device. The identification of a called terminal is used to indicate a terminal which is requested by a network to execute an instruction, and it may be null. The identification includes, but is not limited to, a MAC address of the terminal, and the terminal can be uniquely determined by the identification.

In Step 802, a permanent online terminal receives the message carrying access information which is broadcast by the wireless access device.

In Step 803, the permanent online terminal sends an access request to the wireless access device according to the access information.

In Step 804, the wireless access device provides an access path to the wireless access device for the permanent online terminal which sends the access request.

In Step 805, the permanent online terminal accesses the wireless access device according to the access path provided by the wireless access device.

In Step 806, the permanent online terminal sends a type of the terminal, which accesses the wireless access device, to the wireless access device.

In Step 807, the wireless access device acquires the type of the terminal which accesses the wireless access device.

In Step 808, the wireless access device controls connection between the permanent online terminal and a network.

The step of controlling connection between the permanent online terminal and a network by the wireless access device includes: maintaining connection between the permanent online terminal and the network, and transmitting network communication data to the permanent online terminal.

In Step 809, the permanent online terminal accepts control of the connection between the permanent online terminal and the network by the wireless access device.

Specifically, the step of accepting, by the permanent online terminal, control of the connection between the permanent online terminal and the network by the wireless access device includes: maintaining the connection between the permanent online terminal and the network, and transmitting network communication data through the connection with the network.

Figure 9:
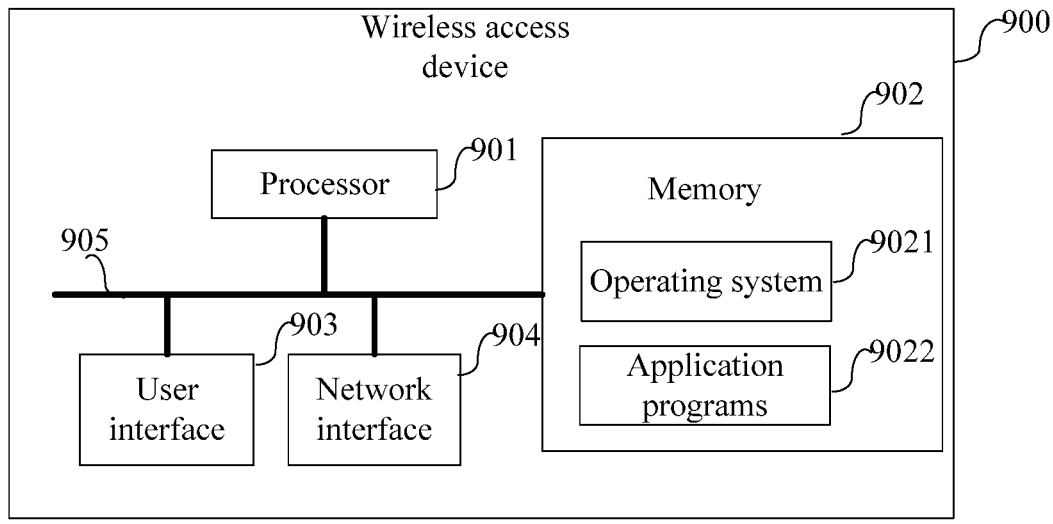
FIG. 9 is a schematic diagram illustrating a structure of a wireless access device according to an embodiment of the present disclosure.

FIG. 9 is a schematic diagram illustrating a structure of a wireless access device according to an embodiment of the present disclosure. The wireless access device 900 may be a router or other device that controls connection. The wireless access device 900 shown in FIG. 9 includes at least one processor 901, a memory 902, at least one network interface 904, and a user interface 903. All components in the wireless access device 900 are coupled together through a bus system 905. It should be understood that the bus system 905 is used to enable connection and communication among the components. The bus system 905 includes a data bus, a power bus, a control bus, and a status signal bus. However, for the purpose of clear illustration, the various buses are labeled as the bus system 905 in FIG. 9.

The user interface 903 is able to be connected to a user's terminal.

It should be understood that the memory 902 may be a volatile memory or a nonvolatile memory, or may include both a volatile memory and a nonvolatile memory. The nonvolatile memory may be a Read Only Memory (ROM), a Programmable Read-Only Memory (PROM), an Erasable Programmable Read-Only Memory (EPROM), an Electrically Erasable Programmable Read-Only Memory (EEPROM), a ferromagnetic random access memory (FRAM), a Flash Memory, a magnetic surface memory, an optical disc, or a Compact Disc Read-Only Memory (CD-ROM), wherein the magnetic surface memory may be a disk memory or a tape memory. The volatile memory may be a Random Access Memory (RAM), which is used as an external cache. Illustratively but not restrictively, a plurality of forms of RAMs may be used, such as a Static Random Access Memory (SRAM), a Synchronous Static Random Access Memory (SSRAM), a Dynamic Random Access Memory (DRAM), a Synchronous Dynamic Random Access Memory (SDRAM), a Double Data Rate Synchronous Dynamic Random Access Memory (DDRSDRAM), an Enhanced Synchronous Dynamic Random Access Memory (ESDRAM), a Sync Link Dynamic Random Access Memory (SLDRAM), and a Direct Rambus Random Access Memory (DRRAM). The memory 902 described in the embodiment of the present disclosure is intended to include, without being limited to, the above memories and any other suitable types of memories.

The memory 902 in the embodiment of the present disclosure is configured to store various types of data to support operation of the wireless access device 900. Examples of such data include all computer programs configured to be executed in the wireless access device 900, such as an operating system 9021 and application programs 9022. The operating system 9021 includes various system programs, such as a framework layer, a core library layer, and a driver layer, so as to implement various basic services and handle hardware-based tasks. The application programs 9022 may include various application programs so as to implement various application services. The programs configured to implement the methods according to the embodiments of the present disclosure may be included in the application programs 9022.

The methods described above may be applied to the processor 901, or implemented by the processor 901. The processor 901 may be an integrated circuit chip and may have signal processing capabilities. During the implementation of the methods, the steps of the methods may be performed through integrated logic circuits (in a form of hardware), or instructions (in a form of software) in the processor 901. The processor 901 may be a general purpose processor, a Digital Signal Processor (DSP), or other programmable logic devices, discrete gates or transistor logic devices, discrete hardware components, and the like. The processor 901 may implement or perform the methods, steps and logic blocks disclosed in the embodiments of the present disclosure. The general purpose processor may be a microprocessor, or any other conventional processor. The steps of the methods disclosed according to the embodiments of the present disclosure may be directly implemented by a decoding processor (hardware), or implemented by a combination of hardware and software modules in the decoding processor. The software modules may be located in a storage medium which is located in the memory 902, and the processor 901 reads information from the memory 902 and performs the steps of the above methods in combination with its hardware.

In exemplary embodiments, the wireless access device 900 may be implemented by one or more of Application Specific Integrated Circuits (ASICs), DSPs, Programmable Logic Devices (PLDs), Complex Programmable Logic Devices (CPLDs), Field-Programmable Gate Arrays (FPGAs), general purpose processors, controllers, Micro Controller Units (MCUs), microprocessors, or other electronic components, so as to performed the aforementioned network management method on the side of the wireless access device.

In exemplary embodiments, an embodiment of the present disclosure further provides a computer-readable storage medium, which may be, for example, the memory 902 containing computer programs. The computer programs may be executed by the processor 901 of the wireless access device 900 so as to perform the steps of the aforementioned methods. The computer-readable storage medium may be a memory such as a FRAM, a ROM, a PROM, a EPROM, a EEPROM, a Flash Memory, a magnetic surface memory, an optical disc, and a CD-ROM, or may be any device including one or any combination of the above memories.

An embodiment of the present disclosure provides a computer-readable storage medium with computer programs stored thereon. When the computer programs are executed by a processor, the corresponding steps of the network management method described above in conjunction with FIG. 1 are performed and the same technical effects are achieved. The method has been described above in detail, and thus will not be repeated here.

Figure 10:
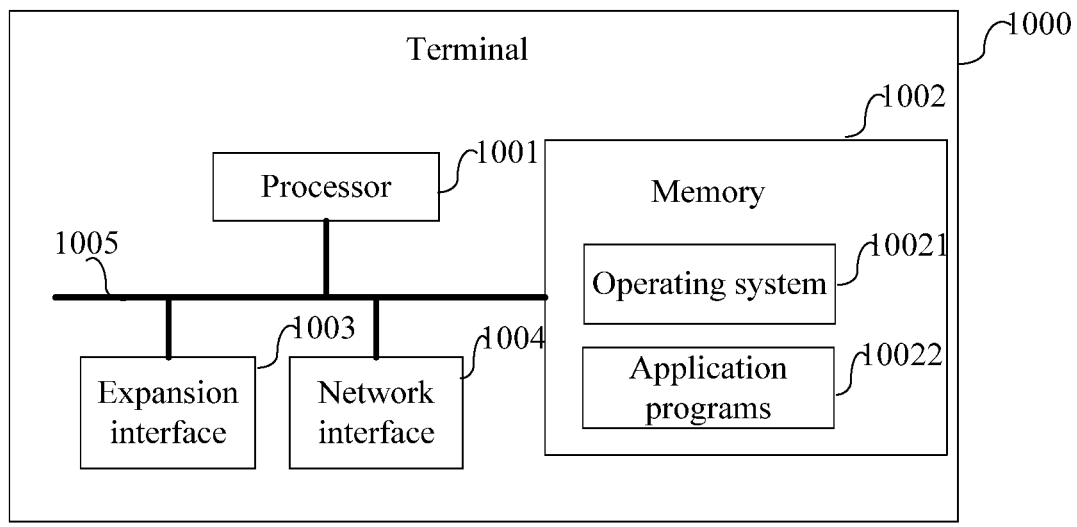
FIG. 10 is a schematic diagram illustrating a structure of a terminal according to an embodiment of the present disclosure.

FIG. 10 is a schematic diagram illustrating a structure of a terminal according to an embodiment of the present disclosure. A terminal 1000 may be a mobile telephone, a computer, a digital broadcast terminal, a message transmitting and receiving device, a game console, a tablet device, a medical device, a fitness device, a personal digital assistant, and the like. The terminal 1000 shown in FIG. 10 includes at least one processor 1001, a memory 1002, at least one network interface 1004, and an expansion interface 1003. All components in the terminal 1000 are coupled together through a bus system 1005. It should be understood that the bus system 1005 is used to enable connection and communication among the components. The bus system 1005 includes a data bus, a power bus, a control bus, and a status signal bus. However, for the purpose of clear illustration, the various buses are labeled as the bus system 1005 in FIG. 10.

The expansion interface 1003 may include a display, a keyboard, a mouse, a trackball, a click wheel, keys, buttons, a touch pad, a touch screen, and the like.

It should be understood that the memory 1002 may be a volatile memory or a nonvolatile memory, or may include both a volatile memory and a nonvolatile memory. The nonvolatile memory may be a ROM, a PROM, a EPROM, a EEPROM, a FRAM, a magnetic surface memory, an optical disc, or a CD-ROM, wherein the magnetic surface memory may be a disk memory or a tape memory. The RAM is used as an external cache. Illustratively but not restrictively, a plurality of forms of RAMs may be used, such as a SRAM, a DRAM, a SDRAM, a DDRSDRAM, a ESDRAM, a SLDRAM, and a DRRAM. The memory 1002 described in the embodiment of the present disclosure is intended to include, without being limited to, the above memories and any other suitable types of memories.

The memory 1002 in the embodiment of the present disclosure is configured to store various types of data to support operation of the terminal 1000. Examples of such data include all computer programs configured to be executed in the terminal 1000, such as an operating system 10021 and application programs 10022, contact data, telephone book data, messages, pictures, videos, etc. The operating system 10021 includes various system programs, such as a framework layer, a core library layer, and a driver layer, so as to implement various basic services and handle hardware-based tasks. The application programs 10022 may include various application programs, such as a Media Player, and a Browser, so as to implement various application services. The programs configured to implement the methods according to the embodiments of the present disclosure may be included in the application programs 10022.

The methods described above may be applied to the processor 1001, or implemented by the processor 1001. The processor 1001 may be an integrated circuit chip and may have signal processing capabilities. During the implementation of the methods, the steps of the methods may be performed through integrated logic circuits (in a form of hardware), or instructions (in a form of software) in the processor 1001. The processor 1001 may be a general purpose processor, a DSP, or other programmable logic devices, discrete gates or transistor logic devices, discrete hardware components, and the like. The processor 1001 may implement or perform the methods, steps and logic blocks disclosed in the embodiments of the present disclosure. The general purpose processor may be a microprocessor, or any other conventional processor. The steps of the network management method on the side of a terminal disclosed according to the embodiments of the present disclosure may be directly implemented by a decoding processor (hardware), or implemented by a combination of hardware and software modules in the decoding processor. The software modules may be located in a storage medium which is located in the memory 1002, and the processor 1001 reads information from the memory 1002, and performs the steps of the above method in combination with its hardware.

In exemplary embodiments, the wireless access device 1000 may be implemented by one or more of ASICs, DSPs, PLDs, CPLDs, FPGAs, general purpose processors, controllers, MCUs, microprocessors, or other electronic components, so as to performed the network management method on the side of the terminal.

In exemplary embodiments, an embodiment of the present disclosure further provides a computer-readable storage medium, which may be, for example, the memory 1002 containing computer programs. The computer programs may be executed by the processor 1001 of the terminal 1000 so as to perform the steps of the aforementioned methods. The computer-readable storage medium may be a memory such as a FRAM, a ROM, a PROM, a EPROM, a EEPROM, a Flash Memory, a magnetic surface memory, an optical disc, and a CD-ROM, or may be any device including one or any combination of the above memories, such as a mobile telephone, a computer, a tablet device, and a personal digital assistant.

An embodiment of the present disclosure provides a computer-readable storage medium with computer programs stored thereon. When the computer programs are executed by a processor, the corresponding steps of the network management method described above in conjunction with FIG. 2 are performed and the same technical effects are achieved. The method has been described above in detail, and thus will not be repeated here.

Figure 11:
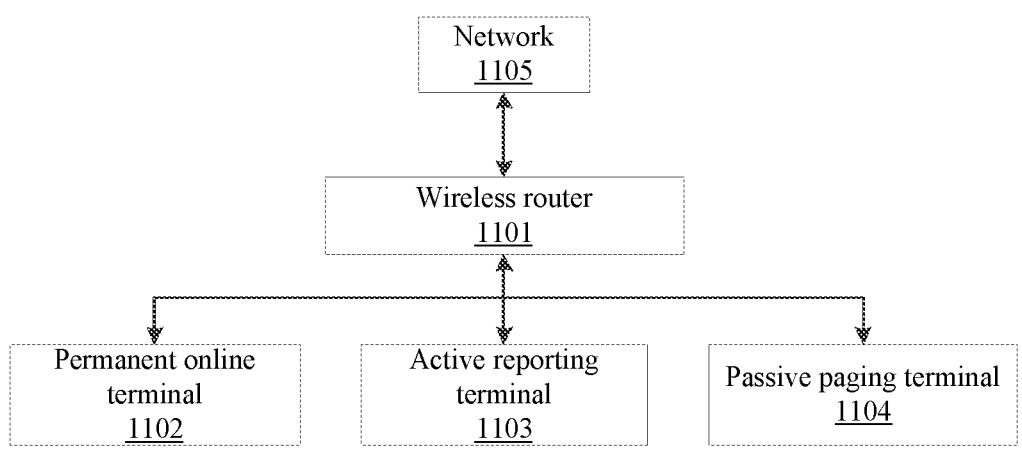
FIG. 11 is a schematic diagram illustrating a structure of a network management system according to an embodiment of the present disclosure.

FIG. 11 is a schematic diagram illustrating a structure of a network management system according to an embodiment of the present disclosure. As shown in FIG. 11, the structure of the network management system includes a wireless router 1101, a permanent online terminal 1102, an active reporting terminal 1103, a passive paging terminal 1104 and a network 1105. The permanent online terminal 1102, the active reporting terminal 1103 and the passive paging terminal 1104 may respectively perform data interaction with the network 1105 through the wireless router 1101, and the network 1105 may broadcast a message carrying access information through the wireless router 1101.

Figure 12:
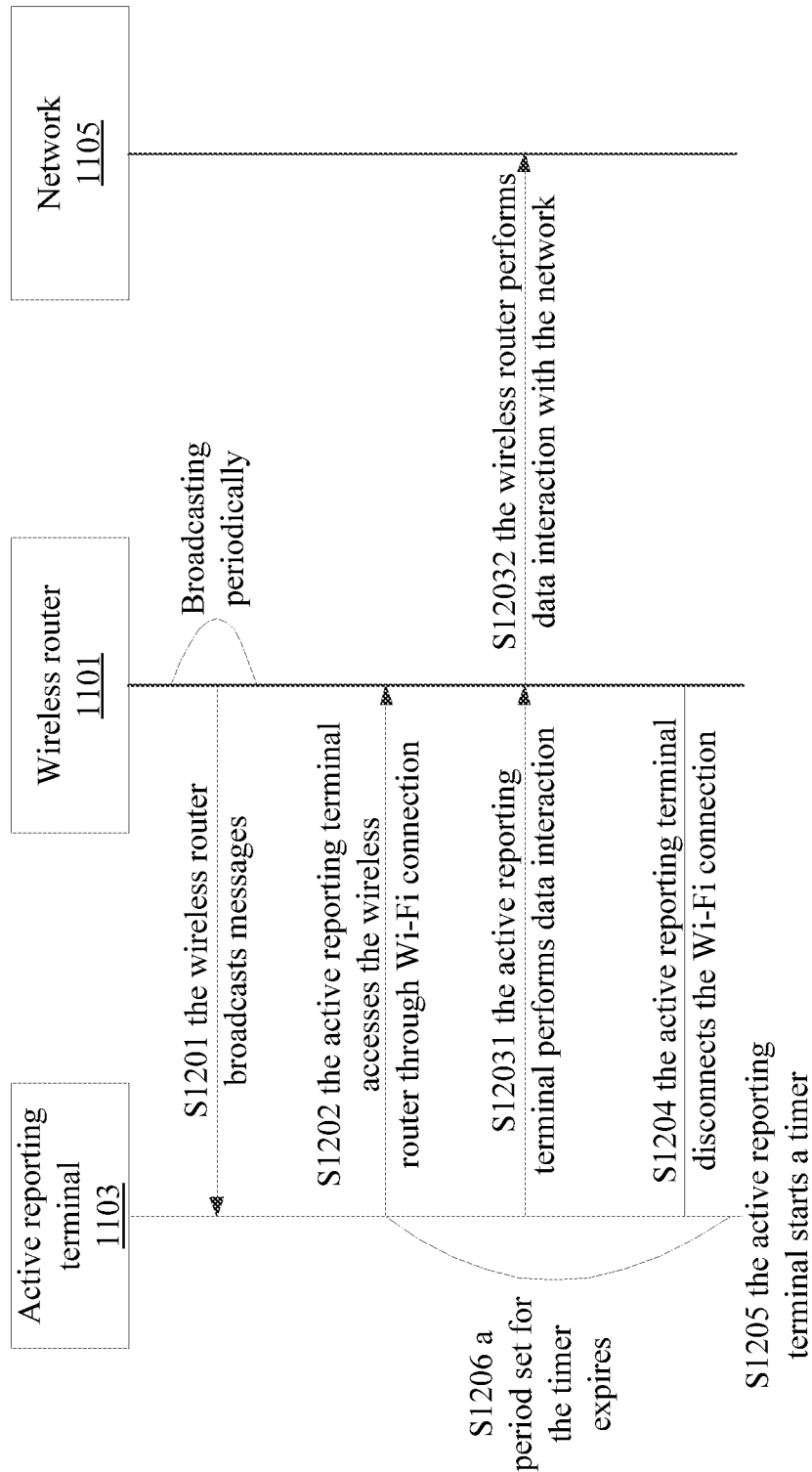
FIG. 12 is a schematic diagram illustrating interaction workflow of a network management system according to an embodiment of the present disclosure, in a case that a terminal is an active reporting terminal.

FIG. 12 is a schematic diagram illustrating interaction workflow of a network management system according to an embodiment of the present disclosure, in a case that a terminal is an active reporting terminal. As shown in FIG. 12, the interaction workflow includes the following Steps S1201-S1206.

In Step S1201, the wireless router 1101 broadcasts messages.

Specifically, access information may include at least one of the following information: an access capability parameter of a wireless access device, a number of connected terminals, and an identification of a called terminal. The access capability parameter of a wireless access device is used to indicate an upper limit of a number of terminals that are allowed to access the wireless access device. The identification of a called terminal is used to indicate a terminal which is requested by a network to execute an instruction, and it may be null. The identification includes, but is not limited to, a MAC address of the terminal, and the terminal can be uniquely determined by the identification.

The wireless router 1101 may broadcast the messages in a periodic way.

In Step S1202, the active reporting terminal 1103 accesses the wireless router 1101 through a Wi-Fi connection.

In Step S12031, the active reporting terminal 1103 performs data interaction with the wireless router 1101.

In Step S12032, the wireless router 1101 performs data interaction with the network 1105.

Specifically, the wireless router 1101 may transmit the data, which is received from the active reporting terminal 1103, to the network 1105.

In Step S1204, the active reporting terminal 1103 disconnects the Wi-Fi connection.

In Step S1205, the active reporting terminal 1103 starts a timer.

In Step S1206, when a period set for the timer expires, the Step S1202 is performed again.

In the case that the terminal is an active reporting terminal, in a process of performing the Steps S1201-S1206 by the network management system, events occurring at the active reporting terminal 1103, which trigger access, include, but are not limited to, a fire alarm or a water alarm is triggered. In this case, the network management system suspends a currently performed step and directly performs the Step S1202.

Figure 13:
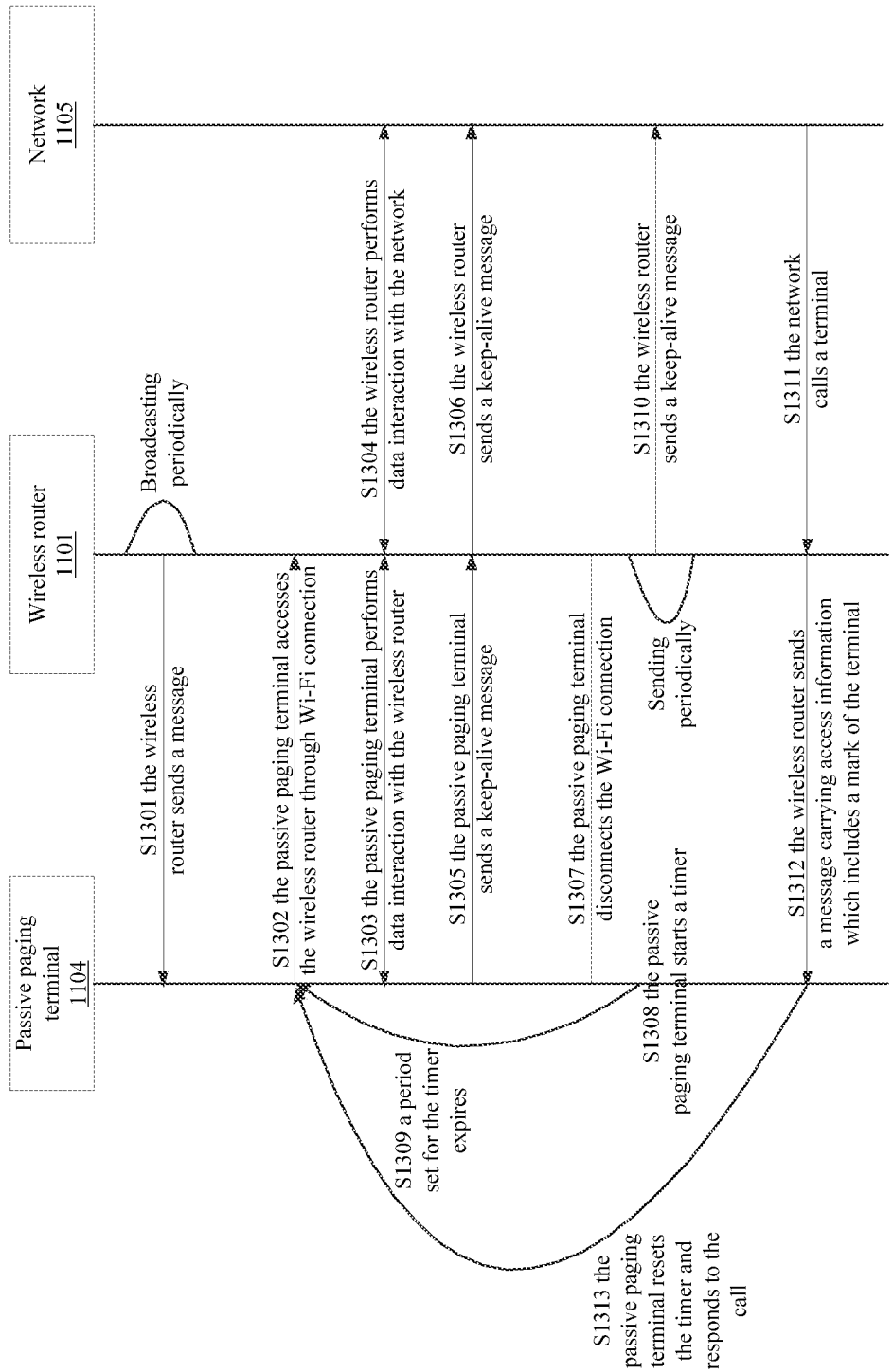
FIG. 13 is a schematic diagram illustrating interaction workflow of a network management system according to an embodiment of the present disclosure, in a case that a terminal is a passive paging terminal.

FIG. 13 is a schematic diagram illustrating interaction workflow of a network management system according to an embodiment of the present disclosure, in a case that a terminal is a passive paging terminal. As shown in FIG. 13, the interaction workflow includes the following Steps S1301-1313.

In Step S1301, the wireless router 1101 sends a message.

Specifically, the message carries access information.

Specifically, the access information may include at least one of the following information: an access capability parameter of a wireless access device, a number of connected terminals, and an identification of a called terminal. The access capability parameter of a wireless access device is used to indicate an upper limit of a number of terminals that are allowed to access the wireless access device. The identification of a called terminal is used to indicate a terminal which is requested by a network to execute an instruction, and it may be null. The identification includes, but is not limited to, a MAC address of the terminal, and the terminal can be uniquely determined by the identification.

In Step S1302, the passive paging terminal 1104 accesses the wireless router 1101 through a Wi-Fi connection.

In Step S1303, the passive paging terminal 1104 performs data interaction with the wireless router 1101.

In Step S1304, the wireless router 1101 performs data interaction with the network 1105.

In Step S1305, the passive paging terminal 1104 sends a keep-alive message.

In Step S1306, the wireless router 1101 sends a keep-alive message.

In Step S1307, the passive paging terminal 1104 disconnects the Wi-Fi connection.

When the passive paging terminal 1104 finishes the transmission of network communication data, it is possible to disconnect a link between the passive paging terminal 1104 and the wireless router 1101 in the connection between the passive paging terminal 1104 and the network 1105, and maintain a link between the wireless router 1101 and the network 1105 in the connection between the passive paging terminal 1104 and the network 1105.

Specifically, the step of maintaining a link between the wireless router 1101 and the network 1105 in the connection between the passive paging terminal 1104 and the network 1105 includes: acquiring a rule of keep-alive messages sent by the passive paging terminal 1104 during accessing, and sending keep-alive messages which conform to the rule to the network 1105 in a preset period. The keep-alive messages are sent for preventing aging of IP links, so as to ensure that the terminal can respond to a call instruction in time in the presence of the call instruction.

In Step S1308, the passive paging terminal 1104 starts a timer.

In Step S1309, when a period set for the timer expires, the Step S1302 is performed.

In Step S1310, the wireless router 1101 sends a keep-alive message.

Specifically, the wireless router 1101 may send keep-alive messages periodically.

In Step S1311, the network 1105 calls the terminal.

In Step S1312, the wireless router 1101 sends a message carrying access information, wherein the access information includes an identification of the passive paging terminal.

In Step S1313, the passive paging terminal 1104 resets the timer and responds to the call.

According to the embodiments described in the present disclosure, the terminals can be classified into three categories according to their characteristics of data transmission: the permanent online terminal, the active reporting terminal and the passive paging terminal, wherein the active reporting terminal and the passive paging terminal can disconnect connection with the wireless access device when data transmission is completed, so as to allow other terminals, which need to transmit data, to access the wireless access device. In addition, according to the embodiments described in the present disclosure, the wireless access device can send a keep-alive message to the network server for the terminal to prevent link aging, so that, when the network server sends a call request, the wireless access device can be accessed by the disconnected passive paging terminal in time, and the passive paging terminal can respond to the call request.

In some cases, a number of terminals which are allowed to access a conventional router is typically 32. By using the network management method provided by the present disclosure, under the conditions that all terminals in the Internet of Things are active reporting terminals or passive paging terminals, the timers of both the active reporting terminal and the passive paging terminal are set for a period of 30 minutes, and the data transmission of both the active reporting terminal and the passive paging terminal last for 3 minutes, at most 320 terminals in the Internet of Things can be accessed to the router. In such a way, utilization of the conventional router is increased by 10 times, and the user does not need to replace an existing router.

It should be understood by those skilled in the art that the embodiments of the present disclosure may be implemented as methods, systems, or computer program products. Accordingly, the embodiments of the present disclosure may take a form of an embodiment of hardware, an embodiment of software, or an embodiment of combination of software and hardware. The embodiments of the present disclosure may take a form of a computer program product operating on one or more computer-usable storage media (including, but not limited to, a disk memory, an optical memory, and the like) which contain computer-usable program codes.

The embodiments of the present disclosure are described with reference to the flowcharts and/or block diagrams of the methods, the devices (systems), and the computer program products provided by the embodiments of the present disclosure. It should be understood that each process and/or block in the flowcharts and/or block diagrams, and combinations of processes and/or blocks in the flowcharts and/or block diagrams can be implemented by computer program instructions. These computer program instructions can be provided for a processor of a general purpose computer, a special purpose computer, an embedded processor or other programmable data processing apparatus to produce a machine, so that the instructions, which are executed by the processor of the computer or other programmable data processing apparatus, can produce a wireless access device configured to implement the functions specified by one or more processes in the flowcharts and/or one or more blocks in the block diagrams.

These computer program instructions can also be stored in a computer-readable memory which can direct the computer or other programmable data processing apparatus to work in a particular manner, so that the instructions stored in the computer-readable memory can produce a product of a wireless access device containing instructions, the wireless access device being capable of implementing the functions specified by one or more processes in the flowcharts and/or one or more blocks in the block diagrams.

These computer program instructions can also be loaded onto the computer or other programmable data processing apparatus to cause the computer or other programmable apparatus to perform a series of operational steps to achieve the processing implemented by a computer, so that the instructions which are executed on the computer or other programmable apparatus provide steps for implementing the functions specified by one or more processes in the flowcharts and/or one or more blocks in the block diagrams.

The embodiments described above are merely exemplary embodiments of the present disclosure, and are not intended to limit the protection scope of the present disclosure. Any modification, equivalent replacement, and improvement made within the spirit and principle of the present disclosure should be included in the protection scope of the present disclosure.

What is claimed is:

1. A network management method, comprising:
    broadcasting a message carrying access information;
    providing an access path to a wireless access device for a terminal which receives the message and sends an access request;

acquiring a type of the terminal which accesses the wireless access device; and controlling connection between the terminal and a network according to the type of the terminal;

wherein in a case that the terminal is a passive paging terminal, the step of controlling connection between the terminal and a network comprises:

when the passive paging terminal finishes transmitting network communication data, disconnecting a link between the passive paging terminal and the wireless access device in the connection between the passive paging terminal and the network, and maintaining a link between the wireless access device and the network in the connection between the passive paging terminal and the network.

2. The method of claim 1, wherein
the step of controlling connection between the terminal and a network further comprises:

receiving an access request sent by the passive paging terminal when the passive paging terminal meets an access condition, and establishing connection between the passive paging terminal and the network, wherein the access condition comprises at least one of the following conditions:

when the passive paging terminal is called by the network;

when a fixed access time arrives; and when an event that triggers access happens at the passive paging terminal.

3. The method of claim 2, wherein
when the passive paging terminal is called by the network, a message carrying access information is sent to the passive paging terminal via the wireless access device, wherein the access information includes an identification of the passive paging terminal, and the identification is used for the terminal to send an access request to the wireless access device when the identification is acquired by the terminal through monitoring.

4. The method of claim 1, wherein
the step of maintaining a link between the wireless access device and the network in the connection between the passive paging terminal and the network comprises:

acquiring a rule of keep-alive messages sent by the passive paging terminal during accessing; and sending keep-alive message which conform to the rule to the network in a preset period.

5. A non-transitory computer-readable storage medium with computer programs stored thereon, wherein when the computer programs are executed by a processor, the processor performs the network management method of claim 1.

6. A wireless access device, comprising a processor, and a memory for storing computer programs capable of being executed by the processor, wherein when the processor executes the computer programs, the processor performs the network management method of claim 1.

7. A wireless access device, comprising:
a broadcast module configured to broadcast a message carrying access information;

a connection processing module configured to provide an access path to a wireless access device for a terminal which receives the message and sends an access request;

a first information transceiver module configured to acquire a type of the terminal which accesses the wireless access device; and a first control module configured to control connection between the terminal and a network according to the type of the terminal, wherein in a case that the terminal is a passive paging terminal, controlling connection between the terminal and a network comprises: when the passive paging terminal finishes transmitting network communication data, disconnecting a link between the passive paging terminal and the wireless access device in the connection between the passive paging terminal and the network, and maintaining a link between the wireless access device and the network in the connection between the passive paging terminal and the network.

8. A network management system, comprising a wireless access device and a terminal, wherein the wireless access device is configured to broadcast a message carrying access information, provide an access path to the wireless access device for the terminal which receives the message and sends an access request, acquire a type of the terminal which accesses the wireless access device, and control connection between the terminal and a network according to the type of the terminal, wherein in a case that the terminal is a passive paging terminal, controlling connection between the terminal and a network comprises: when the passive paging terminal finishes transmitting network communication data, disconnecting a link between the passive paging terminal and the wireless access device in the connection between the passive paging terminal and the network, and maintaining a link between the wireless access device and the network in the connection between the passive paging terminal and the network; and the terminal is configured to receive the message carrying access information which is broadcast by the wireless access device, send the access request to the wireless access device according to the access information, receive the access path provided by the wireless access device, access the wireless access device according to the access path, and accept control of connection between the terminal and a network by the wireless access device.

* * * * *